United States Patent

Fujimoto

[15] 3,641,366

[45] Feb. 8, 1972

[54] MULTIPHASE FIELD EFFECT TRANSISTOR DRIVER MULTIPLEXING CIRCUIT

[72] Inventor: Ted Y. Fujimoto, Santa Ana, Calif.

[73] Assignee: North American Rockwell Corporation

[22] Filed: Sept. 14, 1970

[21] Appl. No.: 71,702

[52] U.S. Cl. ..............................307/251, 307/205, 307/304

[51] Int. Cl. ..............................H03k 17/00

[58] Field of Search ..............307/205, 221 C, 251, 279, 304, 307/208, 210

[56] References Cited

UNITED STATES PATENTS

| | | | |
|---|---|---|---|
| 3,564,299 | 2/1971 | Varadi | 307/251 |
| 3,439,185 | 4/1969 | Gibson | 307/205 |
| 3,506,845 | 4/1970 | Winder | 307/251 |
| 3,517,210 | 6/1970 | Rubinstein | 307/251 |
| 3,560,765 | 2/1971 | Kubinec | 307/251 |
| 3,575,613 | 4/1971 | Ebertin | 307/251 |

OTHER PUBLICATIONS

Kerius, American Micro-Systems Inc. "Low Powej Circuit Design Using 'P' Channel MOS," pp. 186–187 Session 4B paper 4B.2 Advance in MOS Tech.

*Primary Examiner*—Donald D. Forrer
*Assistant Examiner*—R. E. Hart
*Attorney*—L. Lee Humphries, H. Fredrick Hamann and Robert G. Rogers

[57] ABSTRACT

From one to four field effect transistor driver circuits on one semiconductor chip having phase related inputs are gated to a multiplexed output at a different phase times of a multiphase clock cycle and are sampled by corresponding receiver circuits on a different semiconductor chip during the same phase. While one output is being sampled during one phase, an input to another driver is being isolated prior to being gated to the output. The gating sequence is synchronized by a plurality of multiphase clock signals implementing the multiphase clock cycle.

2 Claims, 3 Drawing Figures

INVENTOR.
TED Y. FUJIMOTO
BY
Robert G. Rogers
ATTORNEY

INVENTOR.
TED Y. FUJIMOTO

BY Robert D. Rogers

ATTORNEY

INVENTOR.
TED Y. FUJIMOTO
BY Robert G. Rogers
ATTORNEY

MULTIPHASE FIELD EFFECT TRANSISTOR DRIVER MULTIPLEXING CIRCUIT

BACKGROUND OF THE INVENTION

1. Field of the Invention

The invention relates to a multiphase field effect transistor driver multiplex circuit and more particularly to such a circuit in which from one to four field effect transistor driver circuits are multiplexed with a corresponding number of receiver circuits under the control of a multiphase clock signal cycle synchronizing the gating of the driver inputs to the receiver circuit.

2. Description of the Prior Art

In the usual four phase (4$\phi$) microelectronic circuits, one driver is provided for one receiver. The driver and receivers are ordinarily on different semiconductor chips. As a result, one set of input/output pads and interconnecting conductors are required for each driver-receiver circuit combination. However, since most driver inputs are only available at certain phase times, it would be preferred if a number of drivers being gated by sequential phases of a multiphase clock cycle, could be interconnected or multiplexed at a common output point. In that case, it would be necessary to add sampling circuits at the receiver inputs to prevent gating erroneous information into a receiver prior to the required interval or phase time.

A four phase clock scheme may comprise major, i.e., double width, phase clock signals and/or minor, i.e., single width, phase clock signals. For example, $\phi_{1+2}$, $\phi_{2+3}$, and $\phi_{4+1}$ clock signals are examples of major phase clock signals. $\phi_1$, $\phi_2$, $\phi_3$ and $\phi_4$ clock signals are examples of minor phase clock signals.

The present invention provides a phase synchronized driver-receiver circuit combination which eliminates the necessity for separate input/output pins and conductors between each driver and receiver on the same or on separate semiconductor chips. As a result, the layout area required for each receiver can be reduced.

SUMMARY OF THE INVENTION

Briefly, the invention comprises a plurality of field effect transistor driver circuits on one semiconductor chip having a common (multiplexed) output and a corresponding number of field effect transistor receiver circuits usually on a different semiconductor chip and having a common input connected to said common output.

The driver circuits are synchronously gated by different phases of a multiphase clock signal for sequentially gating driver inputs to the common output. Field effect transistor sampling circuits between the common input and the receiver circuits are also synchronously gated by the phases of the multiphase clocks for sampling the output during the phase that a driver input has been gated to the output, i.e., the phase after the driver input signal has been isolated from the driver to input.

In a four phase system, from one to four field effect transistor driver circuits with a corresponding number of receiver sampling circuits are used. The exact number of driver circuits being multiplexed determines the type of clock signal being used, i.e., major-major or major-minor clock signals. If four drivers are used, minor phase clock signals are used to gate information through the drivers and into the receivers.

In the preferred embodiment, P-type enhancement mode MOS field effect transistors formed in a silicon chip are used. However, N-type devices, depletion mode devices, complementary field effect transistors, MNOS devices, silicon gate devices, and other types of field effect transistors known to persons skilled in the art may also be used. The type and combination of field effect transistors are determined by the requirements of a particular application.

For the preferred embodiment, a logical convention in which a negative voltage level represents logic 1, or true, and in which an electrical ground voltage level represents logic 0, or false, is used. Other logical conventions requiring different voltage levels are also within the scope of the invention.

Therefore, it is an object of this invention to provide an improved multiplexing circuit for field effect transistor drivers.

Another object of this invention is to provide a field effect transistor driver multiplexing circuit having one multiplex output for from one to four field effect transistors drivers and a corresponding number of field effect transistor receiver sampling circuits wherein the driver and sampling circuits are gated in synchronism by different phases of a multiphase clocking cycle.

Still another object of the invention is to provide a driver-receiver circuit combination having a common (multiplex) output terminal in which major-major and major-minor clock signals are used to gate information through a driver and into a receiver during synchronized phases of a multiphase clock scheme.

A still further object of this invention is to provide a field effect transistor driver-receiver circuit combination having a multiplexed common output and an input in which the layout area required for the driver circuits is reduced without unnecessarily delaying the gating of information from the driver input to the receiver input.

These and other objects of this invention will become more apparent when taken in conjunction with the figures of the drawings, a brief description of which follows:

DESCRIPTION OF PREFERRED EMBODIMENTS

Figure 1:
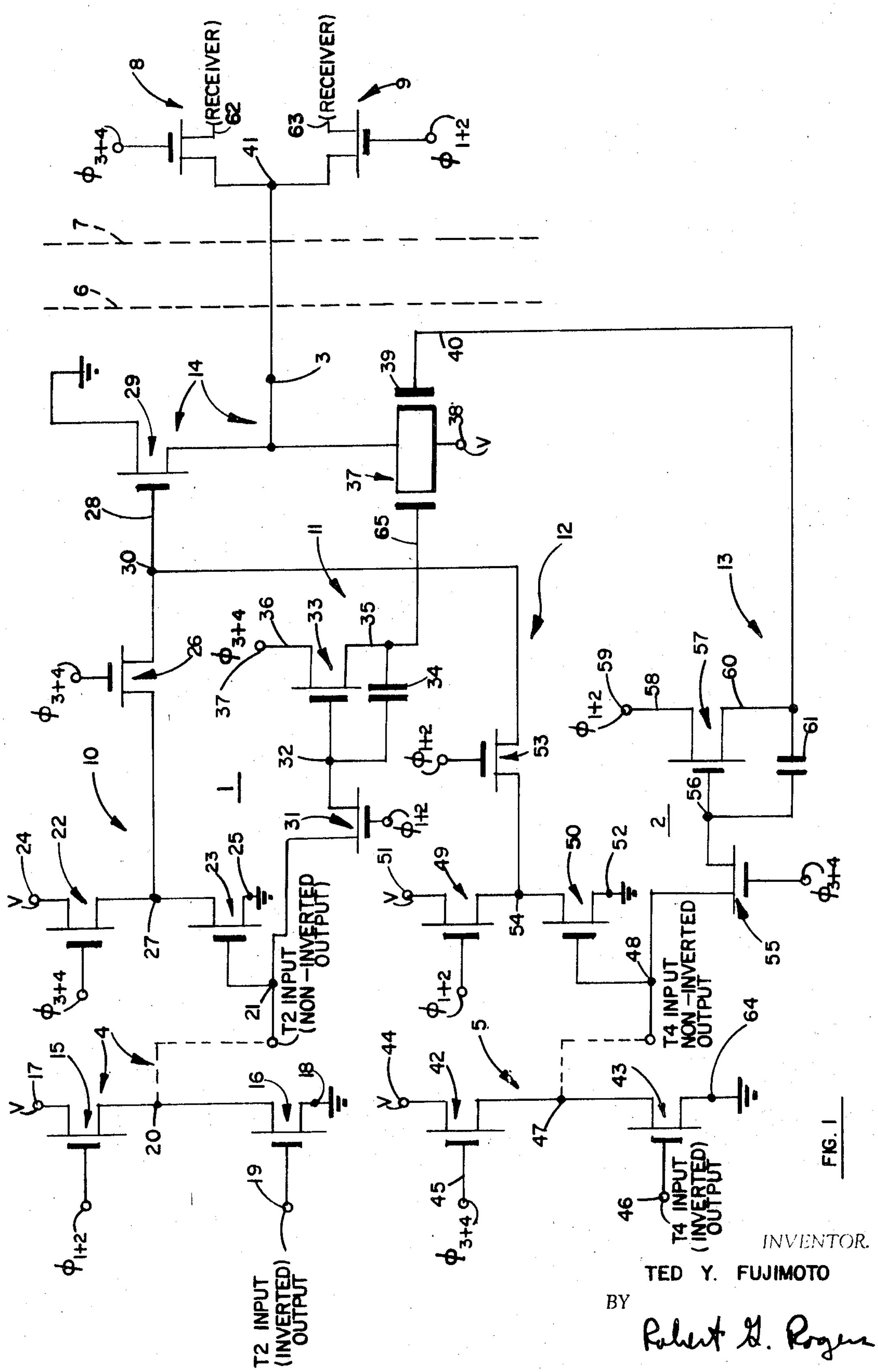
FIG. 1 is a schematic illustration of one embodiment of a driver-receiver circuit combination using major phase clock signals for gating the inputs to two field effect transistor drivers to a multiplexed output which is synchronously sampled by field effect transistor sampling circuits providing inputs to a corresponding number of driver circuits.

FIG. 1 is a schematic view of one embodiment of a four phase driver system comprising drivers 1 and 2 multiplexed at common output 3. THe drivers 1 and 2 include inverting input stages 4 and 5 respectively whenever a noninverted output is required. The drivers are on one semiconductor chip represented by the dotted line 6. THe receivers (not shown) corresponding to each of the driver circuits 1 and 2, are on a separate chip represented by dotted line 7. Sampling circuits 8 and 9 connect the multiplexed output from a driver to the appropriate receiver.

The drivers each include one channel for gating an input signal representing a logic 1, or true state, to the common output 3, and a separate channel for gating a logic 0, or false state, from the input to the multiplexed output 3. The false channel for driver 1 is represented by numeral 10 and the true channel is represented by numeral 11. The false channel for driver 2 is represented by numeral 12 and the true channel for driver 2 is represented by numeral 13. The time shared output stage of both drivers is identified by the numeral 14.

The inverting input stage 4 comprises field effect transistor 15 and field effect transistor 16 connected in electrical series between supply voltage V at terminal 17 and electrical ground at terminal 18. Field effect transistor 15 is gated by the major phase clock signal $\phi_{1+2}$. Field effect transistor 16 is controlled by an input signal on terminal 19, which is connected to the gate electrode of field effect transistor 16, The common point 20 between the field effect transistors 15 and 16 of inverter stage 4 is connected as an input to the driver 1 at common point 21 between the two channels 10 and 11. The $T_2$ input is connected directly to point 21 when a noninverted output is required.

Channel 10 comprises field effect transistors 22 and 23 in electrical series between terminals 24 for supply voltage V and terminal 25 for electrical ground. Field effect transistor 22 is gated by major phase clock signal $\phi_{3+4}$. Field effect transistor 23 is gated by the input signal appearing at common point 21. Field effect transistor 26 is connected at the midpoint 27 between field effect transistors 22 and 23 and the gate electrode 28 of field effect transistor 29 comprising part of the output stage 14. Field effect transistor 26 is gated by major phase clock signal $\phi_{3+4}$. Field effect transistor 26 isolates the gate electrode 28 and point 30 from the driver input during certain phases of the circuit operation as is described in more detail subsequently.

Channel 11 comprises field effect transistor 31 connected between common point 21 and the gate electrode 32 of field effect transistor 33. Field effect transistor 31 is gated by major phase clock signal $\phi_{1+2}$. Capacitor 34 is connected between the source electrode 35 of field effect transistor 33 and its gate electrode 32 for feeding back the voltage from the source electrode to the gate electrode during phases of the circuit operation. The feedback voltage boosts the voltage on the gate electrode for substantially enchancing the conduction of field effect transistor 33. The enhanced conduction of the transistor, substantially reduces the threshold loss through the transistor for providing a relatively high voltage on the source electrode 35. The drain electrode 36 is connected to terminal 37 for major phase clock signal $\phi_{3+4}$. The source electrode 35 is connected to gate electrode 65 of field effect transistor 37 comprising part of the output stage 14. Field effect transistor 37 is connected between the common output 3 and terminal 38 for the supply voltage V. Field effect transistor 39 is connected in electrical parallel with field effect transistor 37 between the output and the supply voltage. Gate electrode 40 of field effect transistor 39 is connected to channel 13 of driver 2.

The multiplexed output 3 is connected as an input to the receiver circuits on a separate chip. The input to the receiver circuits is identified by numeral 41 between sampling field effect transistors 8 and 9. Field effect transistor 8 corresponds to driver 1. In other words, field effect transistor 8 samples the multiplexed output from driver 1 for providing an input to a receiver circuit (not shown). The field effect transistor 8 is gated by major phase clock signal $\phi_{3+4}$. Similarly, field effect transistor 9, gated by major phase clock signal $\phi_{1+2}$, samples the multiplexed output 3 for providing an input to a receiver circuit (not shown) from driver 2.

The inverter stage 5 comprises field effect transistors 42 and 43 connected in series between terminal 44 for supply voltage V and terminal 64 for electrical ground. Transistor 42 is gated by major phase clock signal $\phi_{3+4}$ and transistor 43 is gated by the input signal on terminal 46.

The input to the driver 2, designated by numeral 48, is connected to midpoint 47 between field effect transistors 42 and 43 comprising the input inverter stage. Channel 12 of driver 2 is comprised of field effect transistors 49 and 50 in electrical series between terminal 51 for supply voltage V and terminal 52 for electrical ground. Field effect transistor 49 is gated by major phase clock signal $\phi_{1+2}$ and field effect transistor 50 is gated by the input appearing on terminal 48. Field effect transistor 53 is connected in electrical series between midpoint 54 between field effect transistors 49 and 50 and point 30 providing an input to field effect transistor 29 of the output stage 14. Field effect transistor 53 is gated by major phase clock signal $\phi_{1+2}$.

Channel 13 of driver 2 comprises field effect transistor 55 connected in electrical series between input point 48 and gate electrode 56 of field effect transistor 57. Field effect transistor 55 is gated by major phase clock signal $\phi_{3+4}$. The drain electrode 58 of field effect transistor 57 is connected to terminal 59 for major phase clock signal $\phi_{1+2}$. The source electrode 60 is connected to gate electrode 40 of field effect transistor 39 comprising par of the output stage 14.

Capacitor 61 is connected between the drain electrode 60 and gate electrode 56 for feeding back voltage from the source electrode to the gate electrode for enhancing the conduction of field effect transistor 57 as described in connection with field effect transistor 33. The feedback capacitor connected in the manner shown implements bootstrap driver field effect transistor.

As seen in FIG. 1, the output stage 14 is time shared by drivers 1 and 2. The common output 3 is also tim shared. As a result of time sharing the outputs and the output stage, the driver area required on a semiconductor chip is reduced. The inputs are designated as input T2 and input T4 for inputs 19 and 46 respectively. The T2, T4 designations indicate that the inputs are usable at different phase times of the multiphase clock cycle comprising phases one through four.

For a description of the operation, it is assumed that the inputs are connected directly to points 21 and 48 for drivers 1 and 2. For a first example of an operation, it is also assumed that the input is a logic one, i.e., true. Therefore, during $\phi_1$, point 21 and therefore gate electrode 32 are unconditionally precharged to a voltage level representing logic 1. For the embodiment shown, a negative voltage level is assumed to represent a true or logic 1 state. During $\phi_2$, the input is evaluated and since the input was assumed to be a logic 1, the point 21 and gate electrode 32 remain at the negative voltage level. Field effect transistor 31 is held on during $\phi_1$ and $\phi_2$ by clock signal $\phi_{1+2}$.

During $\phi_{3+4}$, field effect transistor 33 is turned on with the feedback capacitor 34 over driving the gate electrode 32 so that source electrode 35 is driven to the voltage level of clock signal $\phi_{3+4}$. As a result, field effect transistor 37 is turned on relatively hard for driving the common output 3 to approximately the supply voltage level V representing the input logic 1. Therefore, it is seen that the logic 1 at the input is gated to the multiplexed output without inversion. Simultaneously, field effect transistor 8 is turned on by the $\phi_{3+4}$ clock signal for charging the input node 62 to approximately the supply voltage V. Field effect transistor 9 is turned off during $\phi_{3+4}$ time by $\phi_{1+2}$ for isolating the other receiver (not shown).

In addition, during the $\phi_{3+4}$ time, point 27 and point 30 are connected to terminal 25 through field effect transistors 26 and 23. Since terminal 25 is at electrical ground, the gate electrode 28 which is in electrical series with points 30 and 27 is discharged to electrical ground. In other words, since the input at point 21 is true, field effect transistor 23 is turned on. During $\phi_{3+4}$, field effect transistor 26 is also turned on to complete the electrical series path to ground for discharging the charge on gate electrode 28.

The input point 48 and gate electrode 56 of field effect transistor 57 comprising channel 13 and driver 2 are unconditionally set to a negative voltage level during $\phi_3$. During $\phi_4$ of the $\phi_{3+4}$ clock, the input to driver 2 is evaluated so that the charge at point 48 and therefore the gate electrode 56 is conditionally discharged.

Assuming that the T4 input is logic zero, at $\phi_4$, when the input is evaluated, the gate electrode 56 is discharged to electrical ground. As a result, field effect transistor 57 is not turned on during $\phi_1$ time so that field effect transistor 39 is held off during $\phi_{1+2}$ time. Any negative charge on gate electrode 40 of field effect transistor 39 is discharged during $\phi_3$ when the gate electrode 56 is unconditionally set to a negative voltage level. At that time, field effect transistor 57 is turned on to connect the false voltage level of $\phi_{1+2}$ to the gate electrode 40 of field effect transistor 39. A similar connection occurred with field effect transistor 33 during $\phi_1$. The drain electrode 36 is connected to the electrical ground of the $\phi_{3+4}$ clock which is false during $\phi_{1+2}$.

Since the T4 input was assumed to be false, the point 54 is charged to the supply voltage level V, less one threshold, during $\phi_{1+2}$. Field effect transistor 50 is held off by the false state of the input during $\phi_{1+2}$. Therefore, the supply voltage level representing a logic one state, is applied to terminal 30 during $\phi_{1+2}$ for turning on field effect transistor 29. As a result, the common output 3 is at electrical ground or false. The false voltage level at terminal 3 is gated through field effect transistor 9 to input terminal 63 for the receiver corresponding to driver 2 during $\phi_{1+2}$.

During $\phi_{3+4}$, field effect transistor 57 remains off for holding field effect transistor 37 off. Although the operating example only selected cases where the T2 and T4 inputs were logic 1 and logic 0, respectively, it should be obvious that three other possible input states exist. Since each driver is gated by different major phase clock signals, the operation is synchronized. Therefore, regardless of the input states, the correct information is gated through each driver during the appropriate gating phases of the major phase clock signals. Similarly, when the information appears at the output 3, it is gated through an appropriate sampling transistor to the corresponding receiver, It is pointed out that logic 0, or false inputs, are gated to the output 3 via field effect transistor 29 of the output stage 14. The logic true input states are gated to the output 3 via field effect transistors 37 or 39 for drivers 1 and 2, respectively.

Figure 2:
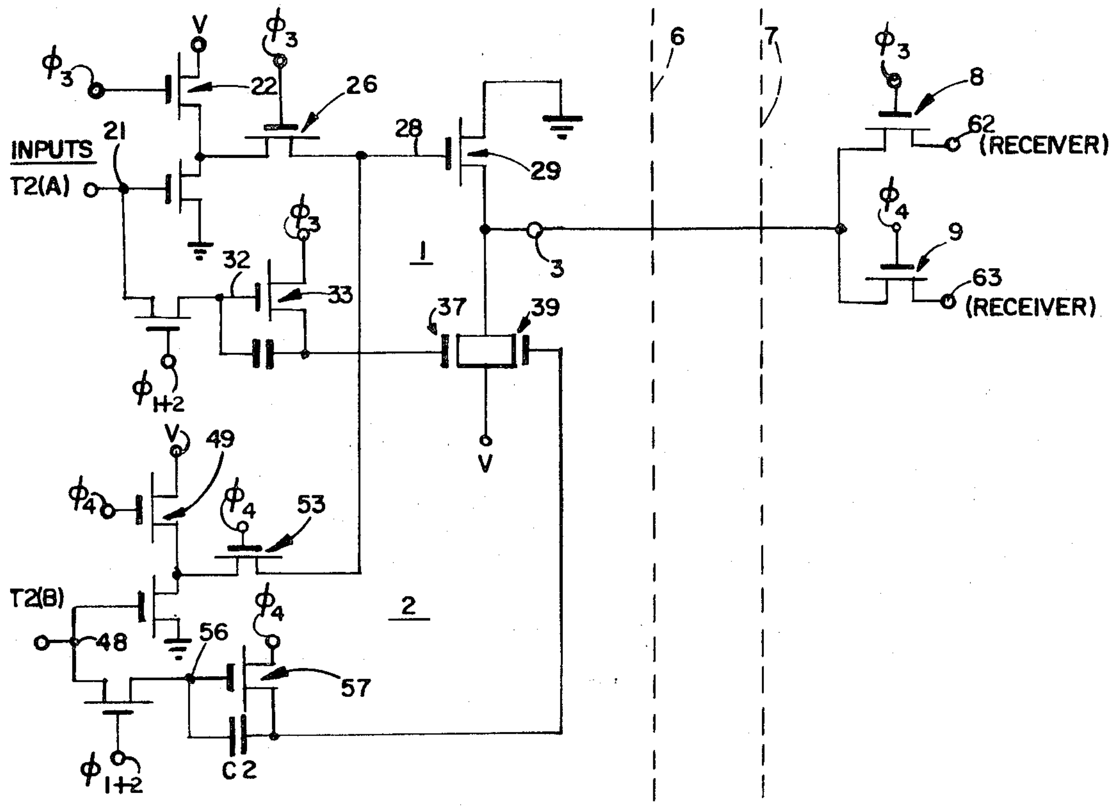
FIG. 2 is a schematic diagram of two field effect transistor driver circuits multiplexed at a common output including a corresponding number of field effect transistor receiver sampling circuits also connected to the multiplexed output with the driver and sampling circuits being gated by major and minor phase clock signals.

The FIG. 2 embodiment is substantially the same as the FIG. 1 embodiment. The difference between the two circuits is in the type of clock signal used. to gate an input to the multiplexed output 3. In FIG. 2, minor phase clock signals as well as major phase clock signals are used.

Since the circuits comprise substantially the same elements, the FIG. 1 numbers are used to identify corresponding elements of the FIG. 2 embodiment. similarly, since the operation of the two circuits is substantially the same, only a brief description of the operation is described herein. The inverter stages 4 and 5 have been omitted for convenience.

It is pointed out that two inputs of the type, $T_2$, shown in FIG. 1 are sampled by both drivers 1 and 2 of the FIG. 2 embodiment. THe $T_2$ inputs are available for gating during phase two. The inputs are shown in FIG. 2 as $T_{2(A)}$ and $T_{2(B)}$. Therefore, instead of sampling one $T_2$ input during $\phi_{3+4}$, as described in connection with driver 1 when field effect transistor 33 is turned on, two $T_2$ inputs corresponding to phases three and four are sampled at the different phases by the different drivers 1 and 2. $T_4$ inputs designated as $T_{4(A)}$ and $T_{4(B)}$ are sampled at $\phi_1$ and $\phi_2$ in a similar manner.

The minor phase signal $\phi_3$replaces the major phase signal $\phi_{3+4}$ in driver 1. Similarly, since the driver 2 is being used to sample a $T_2$ input during $\phi_4$, and $\phi_{1+2}$ signals of driver 2 are replaced by $\phi_4$ signals. The $\phi_{3+4}$ signal at the gate electrode of field effect transistor 55 is replaced by a $\phi_{1+2}$ signal.

In operation, terminals 21 and 48 as well as gate electrode 32 and 56 are unconditionally set to a negative voltage during $\phi_1$. During $\phi_2$, an input to a preceding stage (not shown) is evaluated for each of the drivers such that the voltage level on terminals 21 and 48 conditionally change as a function of the inputs to the preceding stages. For purposes of describing one embodiment, it is assumed that the input to the preceding stage was false so that terminals 21 and 48 remain charged at the end of $\phi_2$ phase. Gate electrodes 32 and 56 are isolated during $\phi_3$, field effect transistor 37 is turned on by the $\phi_3$ clock signal through field effect transistor 33 for applying a negative voltage to output 3. Field effect transistor 8 is also turned on for applying the negative voltage at the output terminal 62 for the driver corresponding to receiver 1.

Similarly, during $\phi_4$, field effect transistor 39 is turned on by the $\phi_4$ clock signal for again connecting the output to a negative voltage level. The negative voltage level is gated through field effect transistor 9 to the terminal 63 for the corresponding receiver.

If the input had been false at the end of $\phi_2$ time, the field effect transistors 33 and 57 would have remained off and field effect transistors 37 and 39 would not have become conductive during $\phi_3$ and $\phi_4$, respectively. During $\phi_3$, field effect transistors 22 and 26 would have been turned on for turning field effect transistor 29 on. As a result, during $\phi_3$, a false voltage level would appear at output 3. The false voltage level i.e., electrical ground, is gated through field effect transistor 8 to input terminal 62 during $\phi_3$. During $\phi_4$, the field effect transistors 22 and 26 would be turned off.

Also during $\phi_4$, field effect transistors 49 and 53 are turned on by clock signals $\phi_4$ for connecting a negative voltage level to the gate electrode 28 of field effect transistor 29. The field effect transistor 29 is turned on for connecting the output 3 to electrical ground. The electrical ground i.e., false voltage level is gated through field effect transistor 9 to receiver input terminal 63.

Figure 3:
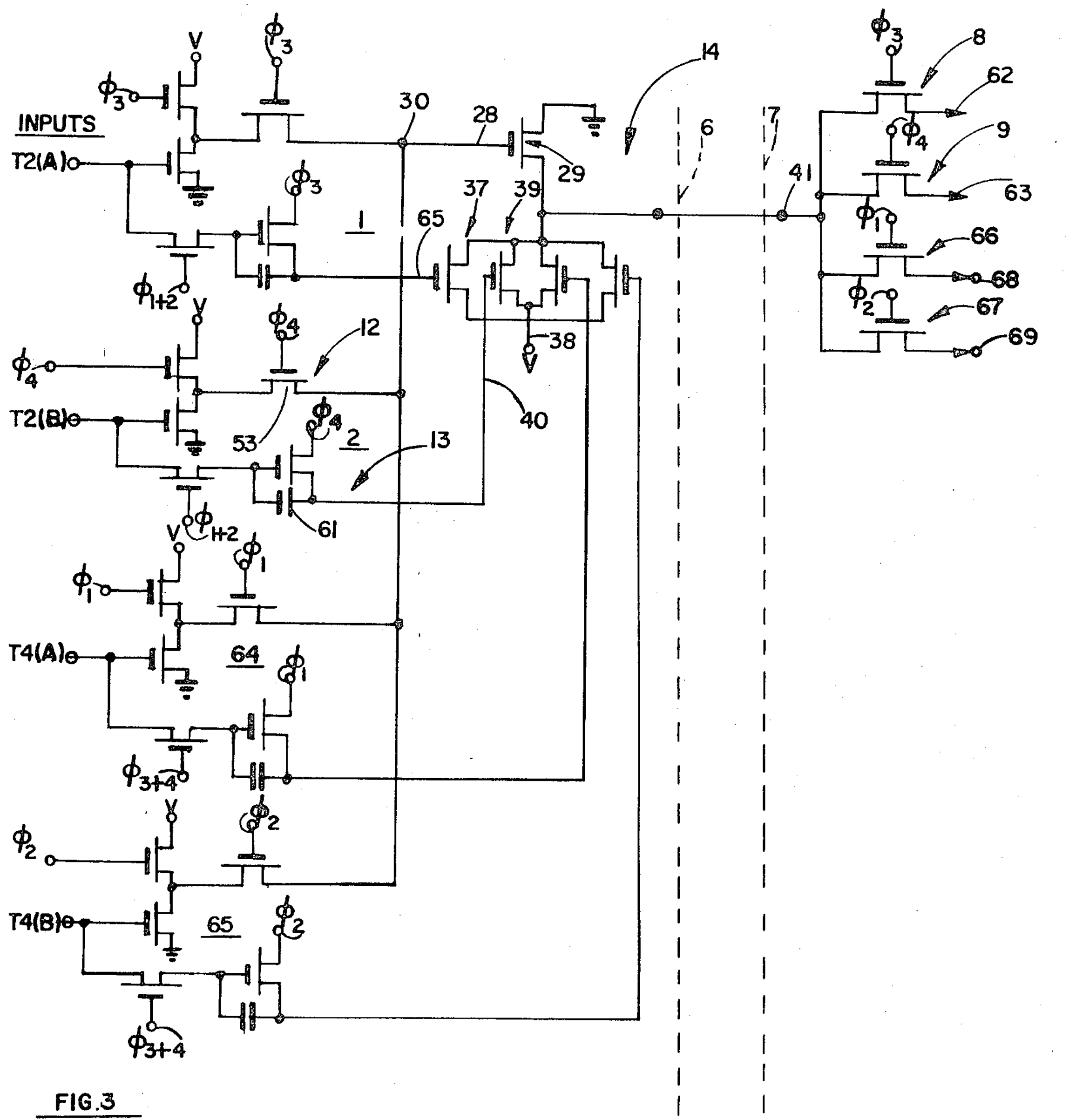
FIG. 3 is a schematic diagram of four field effect transistor driver circuits multiplexed at a common output providing a common input to four field effect transistor sampling circuits for four receiver circuits in which the drivers and sampling circuits are synchronously gated by major and minor phase clock signals.

FIG. 3 is a different embodiment of the FIG. 1 circuit including additional drivers 64 and 65 as well as additional sampling field effect transistors 66 and 67 for providing the output from drivers 64 and 65 to input terminals 68 and 69 for the corresponding receivers (not shown). In effect, FIG. 3 is a FIG. 2 circuit for sampling input $T_{2(A)}$ and $T_{2(B)}$ with additional receivers 66 and 67 for sampling $T_{4(A)}$and $T_{4(B)}$. Driver 2 of FIG. 1 is modified in FIG. 3 so that drivers 64 and 65 sample the $T_4$ inputs during $\phi_1$ and $\phi_2$. The $\phi_{1+2}$ signals of driver 2 are replaced by a single phase $\phi_1$ signal for sampling $T_{4(A)}$ are replaced by the $\phi_2$ single phase signal for sampling $T_{4(B)}$.

Briefly, the $T_{2(A)}$ input is sampled during $\phi_3$ and gated to a receiver through field effect transistor 8. The $T_{2(B)}$ input is sampled during $\phi_4$ and gated through field effect transistor 9 to a receiver during $\phi_4$. The $T_{4(A)}$ input is sampled during $\phi_1$ and gated through sampling field effect transistor 66 during $\phi_1$ to a receiver. The $T_{4(B)}$ input is sampled during $\phi_2$ and gated to the field effect transistor 67 to a receiver during $\phi_2$.

The operation of each channel of each driver is identical to the operation described in connection with FIG. 1 and for that reason is not repeated. Similarly, it should be understood that there can be various combinations of inputs and that when one input is being sampled, the other inputs are isolated from the multiplexed output 3.

I claim:

1. A multiphase multiplexing circuit comprising, a plurality of field effect transistor drivers each having two channels for processing input signals representing first and second input logic states, a first of each of said channels processing a signal representing a first input logic state connected together at a common point, a first field effect transistor having its gate electrode connected to said common point, said first field effect transistor connected between a voltage level representing said first logic state and a common output for said plurality of field effect transistor drivers, a plurality of parallel connected field effect transistors with individual ones of said field effect transistors having their gate electrodes connected to individual channels of said field effect transistor drivers processing signals representing a second input logic state, said paralleled connected field effect transistors connected between a voltage level representing said second logic state and said common output, said field effect transistor drivers each being gated by distinct phase recurring clock signals for gating signals representing input logic states to said common output through said first field effect transistor or said parallel connected field effect transistors as a function of the logic state of an input signal, whereby said common output is multiplexed between all of said drivers, a plurality of field effect transistor sampling circuits corresponding to the plurality of field effect transistor drivers, connected together at said common output for sampling said output, the field effect transistor sampling circuits corresponding to the field effect transistor drivers, being gated by corresponding phase recurring clock signal whereby the inputs to said drivers are gated to the output and sampled by appropriate sampling circuits in synchronism.

2. A multiphase multiplexing circuit comprising, a plurality of field effect transistor drivers connected together at a common output, said field effect transistor drivers each being gated by a distinct phase recurring clock signal for gating a signal representing an input logic stage to said output whereby said common output is multiplexed between all of said drivers, a plurality of field effect transistor sampling circuits corresponding to the plurality of field effect transistor drivers, connected together at said common output for sampling said output, the field effect transistor sampling circuits corresponding to the field effect transistor drivers, being gated by a corresponding phase recurring clock signal whereby the inputs to said drivers are gated to the output and sampled by appropriate sampling circuits in synchronism, said circuit further comprising four distinct input signals time sharing two adjacent phase intervals related to minor phase recurring clock signals, said circuit comprising four drivers with two drivers independently gating consecutive phase portions of one input to said common output during consecutive phase intervals and with the two other drivers independently gating the other input to the common output during consecutive phase intervals following said first recited consecutive phase intervals, each of said drivers being gated by a distinct minor phase clock signal corresponding to said consecutive phase intervals, said field effect transistor sampling circuits being by minor phase clock signals corresponding to the gating signals for associated drivers.

* * * * *